United States Patent
Ai et al.

(10) Patent No.: US 12,185,250 B2
(45) Date of Patent: Dec. 31, 2024

(54) REFERENCE SIGNALING DESIGN AND CONFIGURATION

(71) Applicant: ZTE Corporation, Guangdong (CN)

(72) Inventors: Jianxun Ai, Guangdong (CN); He Huang, Guangdong (CN); Jing Liu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 468 days.

(21) Appl. No.: 17/738,706

(22) Filed: May 6, 2022

(65) Prior Publication Data

US 2022/0264466 A1 Aug. 18, 2022

Related U.S. Application Data

(63) Continuation of application No. PCT/CN2019/116582, filed on Nov. 8, 2019.

(51) Int. Cl.
*H04W 52/02* (2009.01)
*H04W 76/20* (2018.01)

(52) U.S. Cl.
CPC ... *H04W 52/0235* (2013.01); *H04W 52/0229* (2013.01); *H04W 52/0274* (2013.01); *H04W 76/20* (2018.02)

(58) Field of Classification Search
CPC ......... H04W 52/0235; H04W 52/0229; H04W 52/0274; H04W 76/20; H04W 72/20; H04W 52/0206; H04W 76/15; H04W 76/27; Y02D 30/70; H04L 5/0098
See application file for complete search history.

(56) References Cited

U.S. PATENT DOCUMENTS

| | | |
|---|---|---|
| 2009/0285143 A1 | 11/2009 | Kwun et al. |
| 2017/0055242 A1 | 2/2017 | Kusashima et al. |
| 2017/0171908 A1 | 6/2017 | Agarwal et al. |
| 2022/0117022 A1* | 4/2022 | Cheng ............. H04W 76/19 |

(Continued)

FOREIGN PATENT DOCUMENTS

| | | |
|---|---|---|
| CN | 104796930 A | 7/2015 |
| EP | 2416608 A1 | 2/2012 |

(Continued)

OTHER PUBLICATIONS

Rao, Jaya, and Sophie Vrzic. "Packet duplication for URLLC in 5G: Architectural enhancements and performance analysis." IEEE Network 32.2 (2018): 32-40. (Year: 2018).*

(Continued)

*Primary Examiner* — Sharad Rampuria
(74) *Attorney, Agent, or Firm* — Perkins Coie LLP

(57) ABSTRACT

Methods, systems, and devices related to digital wireless communication, and more specifically, to techniques related to implementing SCG suspension. In one exemplary aspect, a method for wireless communication includes detecting data to be transmitted via a group of cells. The method also includes transmitting a first message initiating activation of the group of cells to a network node. In another exemplary aspect, a method for wireless communication includes receiving a first message providing an indication to activate a serving cell included in a group of cells from a network node. The method also includes activating the serving cell of the group of cells based on the first message.

20 Claims, 12 Drawing Sheets

(56) References Cited

U.S. PATENT DOCUMENTS

2022/0225461 A1* 7/2022 Zhang .................. H04W 76/15
2022/0394583 A1* 12/2022 Deenoo ............. H04W 74/0841

FOREIGN PATENT DOCUMENTS

WO       2010049119 A1    5/2010
WO       2014179921 A1   11/2014

OTHER PUBLICATIONS

Canadian office action issued in CA Patent Application No. 3,160,691, dated Jun. 14, 2023, 4 pages.
European Search Report for EP Patent Application No. 19951320.1, dated Nov. 3, 2022, 11 pages.
European Communication pursuant to Article 94(3) EPC issued in EP Patent Application No. 19951320.1, dated Jun. 25, 2024, 7 pages.
Chinese office action issued in CN Patent Application No. 201980102107.8, dated Jul. 2, 2024, 14 pages. English translation included.
Canadian office action issued in CA Patent Application No. 3,160,691, dated Feb. 26, 2024, 4 pages.
International Search Report and Written Opinion mailed on Aug. 10, 2020 for International Application No. PCT/CN2019/116582, filed on Nov. 8, 2019 (7 pages).
Qualcomm Incorporated, "Measurement gap configuration in Dual Connectivity", 3GPP TSG-RAN WG2 meeting #86, Seoul, Korea, R2-142517, May 19-23, 2014, 3 pages.
Canadian office action issued in CA Patent Application No. 3,160,691, dated Oct. 21, 2024, 5 pages.

* cited by examiner

REFERENCE SIGNALING DESIGN AND CONFIGURATION

CROSS-REFERENCE TO RELATED APPLICATIONS

This application is a continuation of International Patent Application No. PCT/CN2019/116582, filed on Nov. 8, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to implementing SCG suspension.

In one exemplary aspect, a method for wireless communication includes detecting data to be transmitted via a group of cells. The method also includes transmitting a first message initiating activation of the group of cells to a network node.

In another exemplary aspect, a method for wireless communication includes receiving a first message providing an indication to activate a serving cell included in a group of cells from a network node. The method also includes activating the serving cell of the group of cells based on the first message.

In another exemplary aspect, a method for wireless communication includes receiving a channel measurement configuration from a secondary network node. The method also includes configuring a reporting configuration relating to channel measurements for a serving cell included in a group of cells based on the channel measurement configuration.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

Some embodiments may preferably implement the following solutions, written in a clause-format.

1. A solution for wireless communication, comprising: detecting, by a terminal, data to be transmitted via a group of cells; and transmitting, by the terminal, a first message initiating activation of the group of cells to a network node.

2. The solution of clause 1, further comprising: receiving, by the terminal, a second message from the network node including an indication to activate the group of cells; and activating, by the terminal, the group of cells as specified in the second message.

3. The solution of clause 2, wherein activating the group of cells includes transitioning the serving cell of the group of cells from dormancy behavior to non-dormancy behavior.

4. The solution of clause 2, wherein activating the group of cells activates the serving cell of the group of cells from a deactivated state to an activated state.

5. The solution of clause 1, wherein the first message includes any of a radio resource control (RRC) message and a medium access control (MAC) control element (CE).

6. The solution of clause 1, wherein the network node includes a master node (MN).

7. The solution of clause 1, further comprising: initiating, by the terminal, a physical random-access channel (PRACH) on a primary secondary cell (PSCell) of the group of cells.

8. The solution of clause 7, further comprising: receiving, by the terminal, a response message from a secondary node (SN) that indicates a serving cell included in the group of cells to be transited from dormancy behavior to non-dormancy behavior, or activated from deactivated state.

9. The solution of clause 1, wherein the first message is indicative of a data buffer size and a logical channel group.

10. The solution of clause 1, further comprising: mapping, by the terminal, the data to a data radio bearer (DRB).

11. The solution of clause 10, wherein the DRB includes a bearer for the group of cells indicating that the DRB is mapped to the group of cells and includes a leg for the group of cells.

12. The solution of clause 10, wherein the DRB includes a split bearer indicating that the DRB includes a master cell group (MCG) leg and a leg for the group of cells.

13. A solution for wireless communication, comprising: receiving, by a terminal, a first message providing an indication to activate a serving cell included in a group of cells from a network node; and activating, by the terminal, the serving cell of the group of cells based on the first message.

14. The solution of clause 13, wherein activating the group of cells includes transitioning the serving cell of the group of cells from dormancy behavior to non-dormancy behavior.

15. The solution of clause 13, wherein activating the group of cells includes activating the serving cell of the group of cells from a deactivated state to an activated state.

16. The solution of clause 13, wherein the network node includes a master node (MN).

17. The solution of clause 16, wherein the MN is configured to receive a second message including the serving cell to be activated from dormancy behavior to non-dormancy behavior and includes dedicated physical random-access channel (PRACH) resources from a secondary node (SN), the first message including information included in the second message.

18. The solution of clause 17, further comprising: transitioning, by the terminal, the serving cell from dormancy behavior to non-dormancy behavior according to the information included in the second message.

19. The solution of clause 13, wherein the first message includes any of a radio resource control (RRC) message, a medium access control (MAC) control element (CE), and downlink control information (DCI).

20. The solution of clause 16, wherein the MN is configured to determine whether to activate the group of cells.

21. The solution of clause 13, further comprising: receiving, by the terminal, an RRC reconfiguration message from the network node; and responsive to determining that the RRC reconfiguration message includes a configuration for the group of cells, activating the group of cells according to the configuration for the group of cells.

22. A solution for wireless communication, comprising: receiving, by a primary network node, a channel measurement configuration from a secondary network node; and configuring, by the primary network node, a reporting configuration relating to channel measurements for a serving cell included in a group of cells based on the channel measurement configuration.

23. The solution of clause 22, wherein the channel measurement includes any of a channel state information (CSI) measurement and a channel quality indicator (CQI) measurement.

24. The solution of clause 22, further comprising: sending, by the primary network node, the configured reporting configuration to the secondary network node, the secondary network node configured to send a radio resource control (RRC) message to a terminal that includes channel measurement resources on the serving cell of the group of cells and the channel reporting configuration on a serving cell of a master group of cells.

25. The solution of clause 22, further comprising: receiving, by the primary network node, a report that includes the channel measurements for the serving cell of the group of cells.

26. The solution of clause 25, further comprising: forwarding, by the primary network node, the received report that includes the channel measurements for the serving cell of the group of cells to the secondary network node.

27. The solution of clause 26, wherein the received report that includes the channel measurements for the serving cell of the group of cells is forwarded by the primary network node to the secondary network node via a control plane (CP) message.

28. The solution of clause 26, wherein the received report that includes the channel measurements for the serving cell of the group of cells is forwarded by the primary network node to the secondary network node via a user plane (UP) message.

29. The solution of clause 22, wherein the reporting configuration configured by the primary network node is valid when the group of cells is suspended.

30. The solution of clause 26, wherein the received report including the channel measurements for the serving cell of the group of cells forwarded to the secondary network node includes CSI reporting information that includes a cell identifier and reporting content.

31. An apparatus for wireless communication comprising a processor that is configured to carry out the solution of any of solutions 1 to 30.

32. A non-transitory computer readable medium having code stored thereon, the code when executed by a processor, causing the processor to implement a solution recited in any of solutions 1 to 30.

The details of one or more implementations are set forth in the accompanying attachments, the drawings, and the description below. Other features will be apparent from the description and drawings, and from the clauses.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

Overview

In 3GPP NR, dormancy behavior of a serving cell is introduced to save UE power. When a serving cell is in dormancy behavior, the UE may generally not be required to monitor PDCCH on the serving cell, but the UE may keep channel state information (CSI) measurement on this serving cell to maintain automatic gain control (AGC) and fine time/frequency synchronization to minimize the delay used for transition from dormancy behavior to non-dormancy behavior (or a normal active state).

In many cases (e.g., both NR an E-UTRAN), a serving cell can be in any of an activated, deactivated, or dormant state. A UE can perform downlink and uplink activities on a serving cell in activated state. No downlink or uplink transmission may be performed on a serving in a deactivated state. The UE may perform channel measurements on a serving cell in dormant state.

Figure 1:
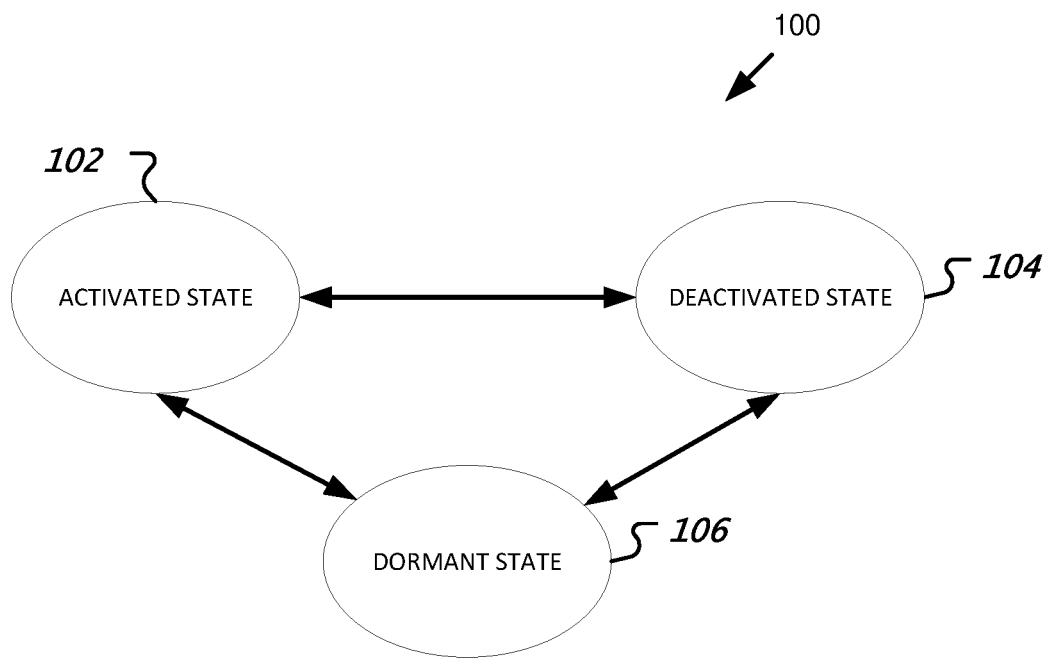
FIG. 1 is a block diagram of an example set of states for a serving cell.

FIG. 1 is a block diagram 100 of an example set of states for a serving cell. As shown in FIG. 1, the serving cell can transition between an activated state 102, a deactivated state 104, and a dormant state 106.

In many cases, the dormancy behavior of a serving cell may be implemented by configuring a bandwidth part (BWP) without physical downlink control channel (PDCCH) configuration. Dormancy behavior may only be applied to a serving cell in an activated state. This BWP may be referred to as a dormant BWP of the serving cell. When the active BWP of a serving cell is the dormant BWP, the serving cell may be in dormancy behavior. Otherwise, the serving cell may be in non-dormancy behavior. The base station (BS) may transition a serving cell to dormancy behavior by L1 signaling (i.e. DCI).

Figure 2:
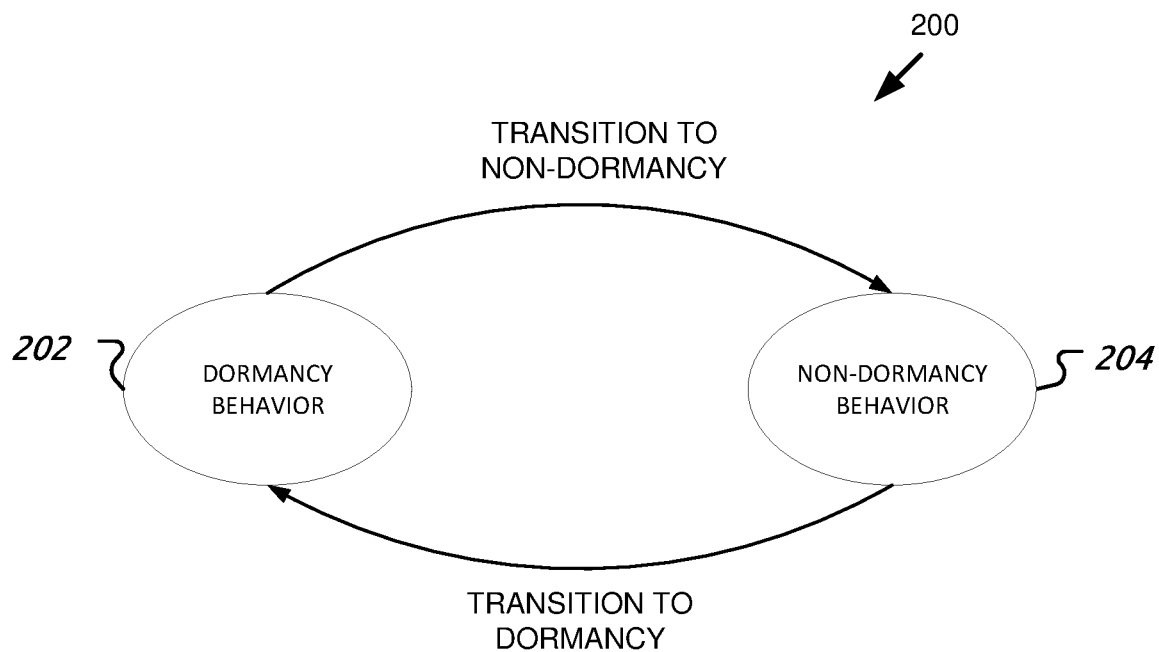
FIG. 2 is a block diagram of an example transition between behavior of a serving cell.

FIG. 2 is a block diagram 200 of an example transition between behavior of a serving cell. As shown in FIG. 2, the serving cell in dormancy behavior 202 can transition to non-dormancy behavior 204. Similarly, the serving cell in non-dormancy behavior 204 can transition to dormancy behavior 202.

In many cases, a UE can be configured with a master cell group (MCG) and a secondary cell group (SCG). MCG and SCG may comprise a group of serving cells. A MCG may be anchored on the network node or BS, which may be referred to as a master node (MN). SCG may be anchored on the network node or BS, which may be referred to as a secondary node (SN). MN and SN may communicate via inter-node interfaces called Xn or X2 interface in NR and E-UTRAN respectively. The primary serving cell in MCG may be a primary cell (PCell) and the primary serving cell in SCG may be a primary secondary cell (PSCell).

Figure 3:
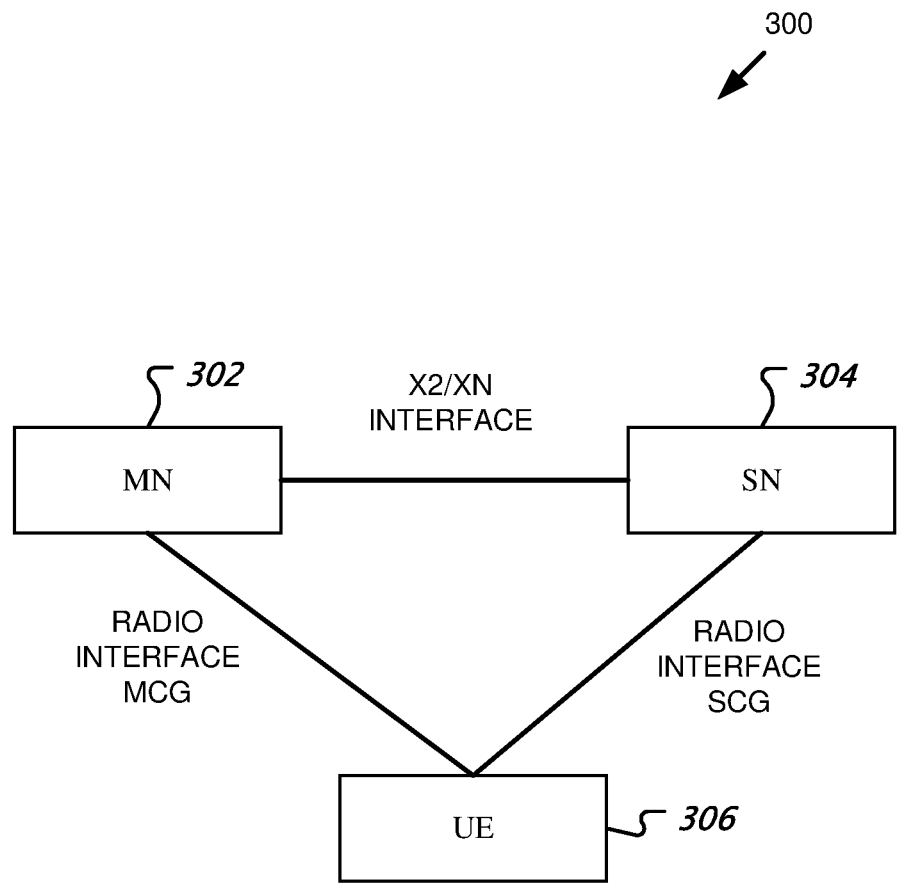
FIG. 3 is a block diagram of a MN, SN, and UE.

FIG. 3 is a block diagram 300 of a MN 302, SN 304, and UE 306. As shown in FIG. 3, the MN 302 may communicate to a SN 304 via an X2/Xn interface. The MN 302 may communicate to a UE 306 via a radio interface MCG. The SN 304 may communicate with the UE 306 via a radio interface SCG.

Further, in many cases, a PSCell may always be activated if it is configured. Accordingly, it may be beneficial to transition SCG or PSCell to suspension in some cases that there may be no need for data transmission on the SCG to save UE power in when UE is in an RRC CONNECTED state.

System Overview

The present embodiments may provide methods to implement SCG suspension. The UE may initiate activation of an SCG upon UL data arrival. The UE may transmit a RRC/MAC CE message to a MN. The UE may initiate PRACH to a PSCell. In some embodiments, a RACH Msg4/Msg2 may indicate which serving cell is to be activated to non-dormancy. A data buffer size or LCG may be included in a message transmitted by the UE as described herein.

In some embodiments, the SCG may be activated by the network. In one case, an MN may initiate SCG activation. This may be performed via a SN modification procedure. The SN modification procedure may include the SN indicating a dedicate PRACH and which serving cell is to be activated/transitioned from dormancy behavior. The MN may generate a message (RRC, MAC CE, or DCI) to activate SCG, where the message may include which serving cell is to be activated.

In another case, the SN may initiate SCG activation. The SN may indicate a MN activation request that includes which serving cell is to be activated/transitioned from dormancy behavior and dedicated PRACH resources. The MN may generate an RRC or MAC CE or DCI to activate the SCG.

In another case, the UE may autonomously activate the SCG upon RRC reconfiguration. If RRC reconfiguration contains SCG configuration, the UE may activate the PSCell and apply the configuration.

The present embodiments may relate to reporting channel measurements. To configure channel measurement reporting, the SN may send to the MN a serving cell index list, measurement resource configuration, or resource config-ID, and reporting quantity. The MN may configure channel measurement reporting resources and associate a reporting resource and a measurement resource.

In a first case, the MN may send the reporting configuration to the SN. The SN may then generate RRC to the UE. In a second case, the MN may send the reporting configuration to the UE directly. The RRC message may be generated by the MN that can be used to suspend SCG.

The configuration may only be valid when SCG is suspended. The suspension of SCG may start upon a RRC message/MAC CE/DCI that suspended the SCG. The suspension of SCG may stop upon SCG activation via RRC/MAC CE/DCI/timer expiration.

A MN may forward channel measurement reporting to the SN. This may be performed via a control plane (CP), where an Xn/X2 message may be used for forwarding CSI reporting. This may be performed via a user plane (UP), where an Xn/X2 tunnel may be used for forwarding CSI reporting. The CSI reporting may include a cell ID and reporting content as well as a list of reporting sorted by a cell ID value.

In the present embodiments, a suspended SCG may mean that a PSCell is in deactivated state or dormancy behavior. The suspended SCG may mean that PSCell and all other serving cells of SCG are in deactivated state. The suspended SCG may mean that PSCell is in dormancy behavior, and other serving cells are in dormancy behavior or deactivated state. The suspended SCG may mean that PSCell is in dormant state, other SCG serving cells are in dormant state or deactivated state.

In the present embodiments, activation of SCG may mean a transition of at least the PSCell from dormancy behavior to non-dormancy behavior if it is in dormancy behavior, or activating at least the PSCell from deactivated state if it is in a deactivated or dormant state.

Example Embodiment 1

Example Embodiment 1 may relate to the UE initiating a SCG activation procedure. Upon uplink data reception by a UE, the uplink data may be mapped on a data radio bearer (DRB). The DRB may be a SCG bearer, where the DRB may be mapped on the SCG and has at least one SCG leg. The DRB may be a split bearer, where the DRB has at least a MCG leg and at least a SCG leg.

Alternatively, upon uplink RRC message is to be transmitted via a signaling radio bearer (SRB). The SRB may be mapped on SCG only. In particular, the SRB may be a SRB3 established on SCG. The SRB may be a split SRB, where the SRB may include at least a MCG leg and at least a SCG leg.

The UE may initiate SCG activation procedure according any of the following methods as described herein.

Method 1

Method 1 may relate to a UE transmitting a RRC message or a MAC CE, via MCG to the BS. In some embodiments, the RRC message may include the information of a DRB which has uplink data to be transmitted or information of a SRB which has uplink RRC message to be transmitted. In some embodiments, the information includes a DRB ID and data buffer size information that indicate a total data volume available for transmission for the DRB. In some embodiments, the information may include a SRB ID.

In some embodiments, an RRC message may include a logical channel group ID (LCID) and the data buffer size information that can indicate the total amount of data available for transmission of the logical channel group.

The MAC CE may be identified with a unique (LCID) defined by specification or previously configured by a BS. The LCID may indicate that a MAC CE is used to transmit data buffer size information for SCG or to notify the request of uplink transmission via SCG. The MAC CE may include a logical channel group information and corresponding data buffer size information.

Figure 4:
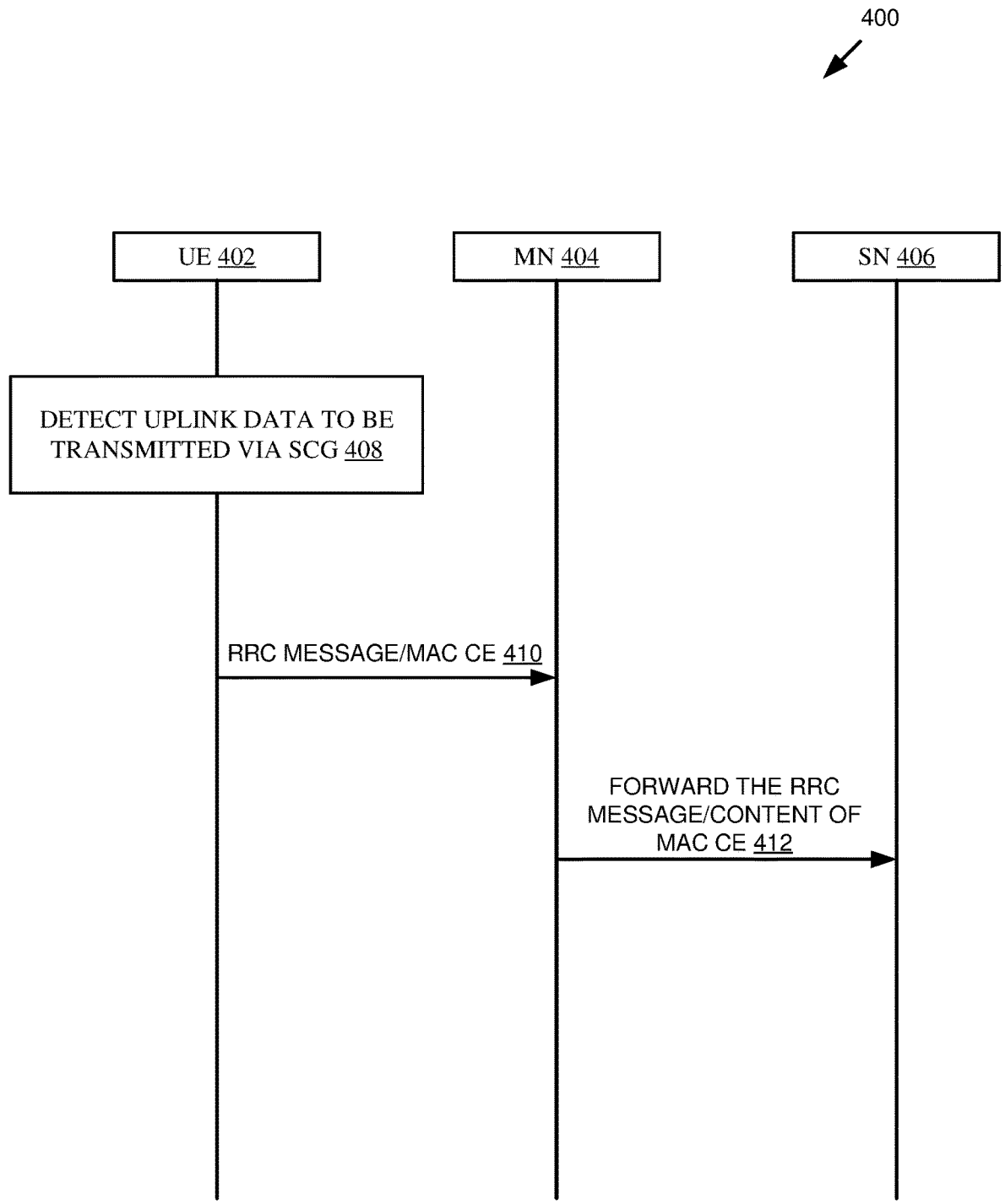
FIG. 4 is an example signaling process for forwarding an RRC message to an SN.

FIG. 4 is an example signaling process 400 for forwarding an RRC message to an SN. The UE 402 may determine that there is uplink data or message to be transmitted via SCG (block 408). The UE 402 may send an RRC message/MAC CE 410 to MN 404. Upon reception of the RRC message or the MAC CE, the MN may initiate a SCG activation procedure as described in greater detail below.

The MN 404 may forward the received RRC message 412 or the MAC CE to the SN 406. In some embodiments, the MN 404 may forward the content of the RRC message or the MAC CE to the SN or indicate to the SN 406 a SCG activation request.

Method 2

Method 2 generally relates to initiating a random-access channel (RACH) procedure via SCG (PSCell). The UE may initiate a RACH procedure. The RACH procedure may include one of a 4 step RACH procedure or a 2 step RACH procedure.

Figure 5:
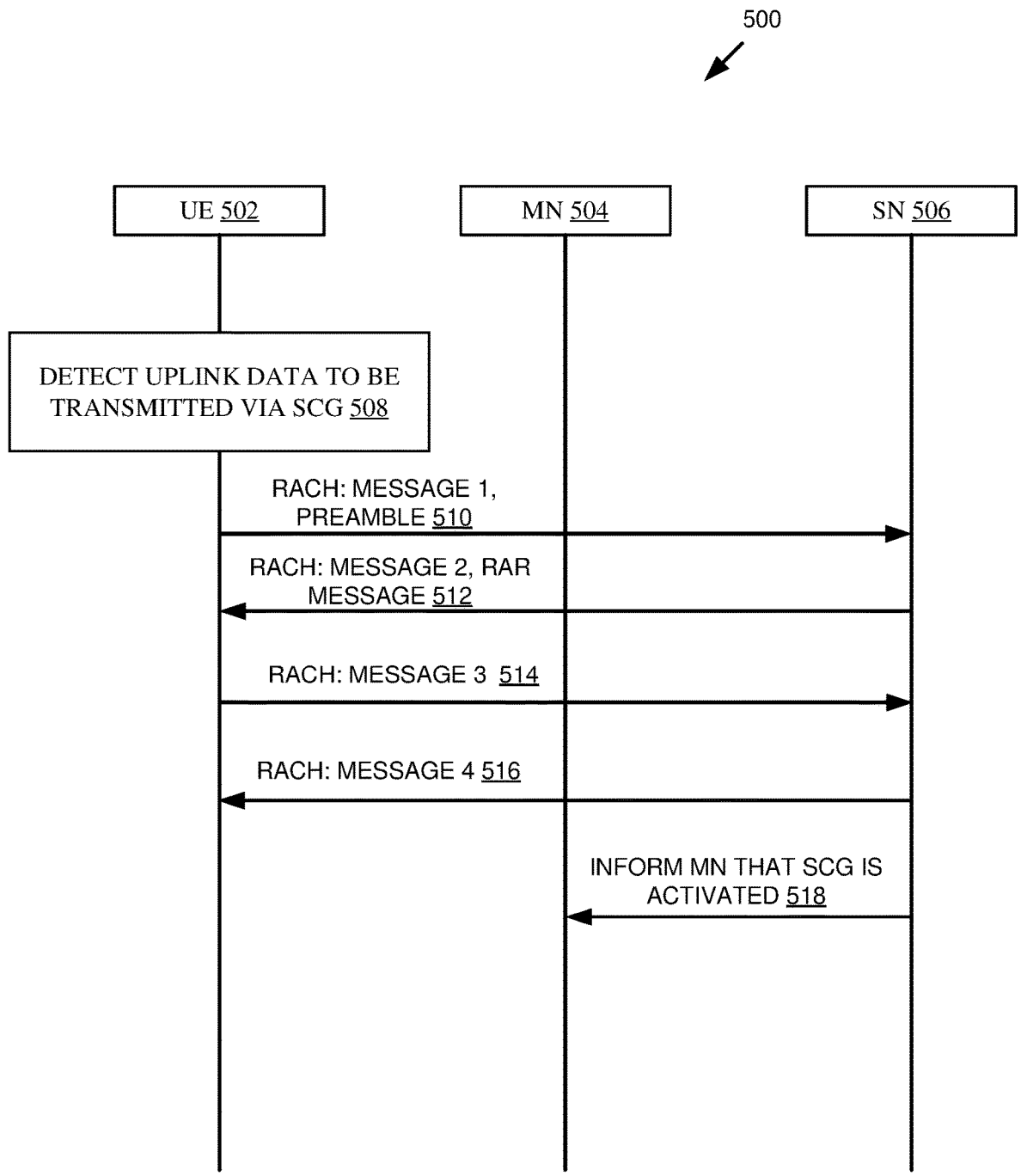
FIG. 5 is an example signaling process of a RACH procedure.

FIG. 5 is an example signaling process 500 of a RACH procedure. As shown in FIG. 5, a UE 502 may determine that there is uplink data or a message to be transmitted via SCG (block 508).

The UE 502 may send a preamble message 510 (msg1) to the SN 506. The SN 506 may send a random access response (RAR) message 512 (msg2) to the UE 502.

The UE 502 may send a RACH msg3 514 to SN 506. Msg3 can include a UE ID, LCG ID and data buffer size, or a DRB ID list or a SCG activation request.

SN 506 may send RACH msg4 516 to the UE 502. Msg4 can include serving cell information of a serving cell to be activated/transitioned to non-dormancy behavior.

SN 506 may send a message 518 to MN 504 indicating that SCG is activated.

In msg3 of a 4 step RACH procedure and in message 1 of a 2 step RACH procedure, a UE ID may be included to identify the UE.

In some embodiments, the UE ID may be the C-RNTI allocated to the UE by the SN. In some embodiments, message 3 and/or message 1 may further include a DRB ID and the data buffer size information which indicate the total data volume available for transmission for this DRB. In some embodiments, the information may include a SRB ID or an indication that there is RRC message to be transmitted via SCG.

In some embodiments, the message 3 and/or message 1 may contain a logical channel group ID, and the data buffer size information which indicate the total amount of data available for transmission of this logical channel group. In some embodiments, the message 3 and message 1 may include an indication to request activating SCG. In response to receiving message 3 and message 1 respectively, the SN may indicate to the UE via message 4 and message 2, respectively.

In some embodiments, a bitmap may be generated to indicate the serving cell or cell group to be activated or transited from dormancy behavior to non-dormancy behavior. The bitmap may include one bit per SCG serving cell or one bit per cell group. In some embodiments, the bitmap may be included in the DCI that schedules the message 4 or message 2.

In some embodiments, a list of SCG serving cell index or a list of serving cell ID and corresponding serving cell state of each SCG serving cell may be included. Upon reception of message 4 or message 2, the UE may activate a serving cell or transit a serving cell from dormancy to non-dormancy according to received message 4 or message 2. In some embodiments, the SN may inform MN that the SCG is activated.

The UE can indicate SN there is uplink data to be transmitted directly, but not via MN. One benefit of this method may include the delay of SCG activation can be reduced compared to other options. In the 2 step RACH case, there may be no message 3 and message 4, the content in message 3 and message 4 in following case can be carried in message 1 and message 2.

Example Embodiment 2

Example Embodiment 2 may generally relate to an SN initiating a SCG activation procedure. In many cases, the SN may initiate SCG activation by indicating MN that there is downlink data arrival via an interface between MN and SN.

In the present embodiments, when an SN initiates SCG activation procedure to transit SCG from suspended to normal state, the SN can provide an indication to the MN. This indication may include dedicated PRACH resource information for the UE to perform RACH procedure on a SCG serving cell. The dedicated PRACH resource may be a contention free RACH resource in a SCG serving cell. This dedicated PRACH resource may be forwarded to UE by MN to speed up synchronization with SN.

Figure 6:
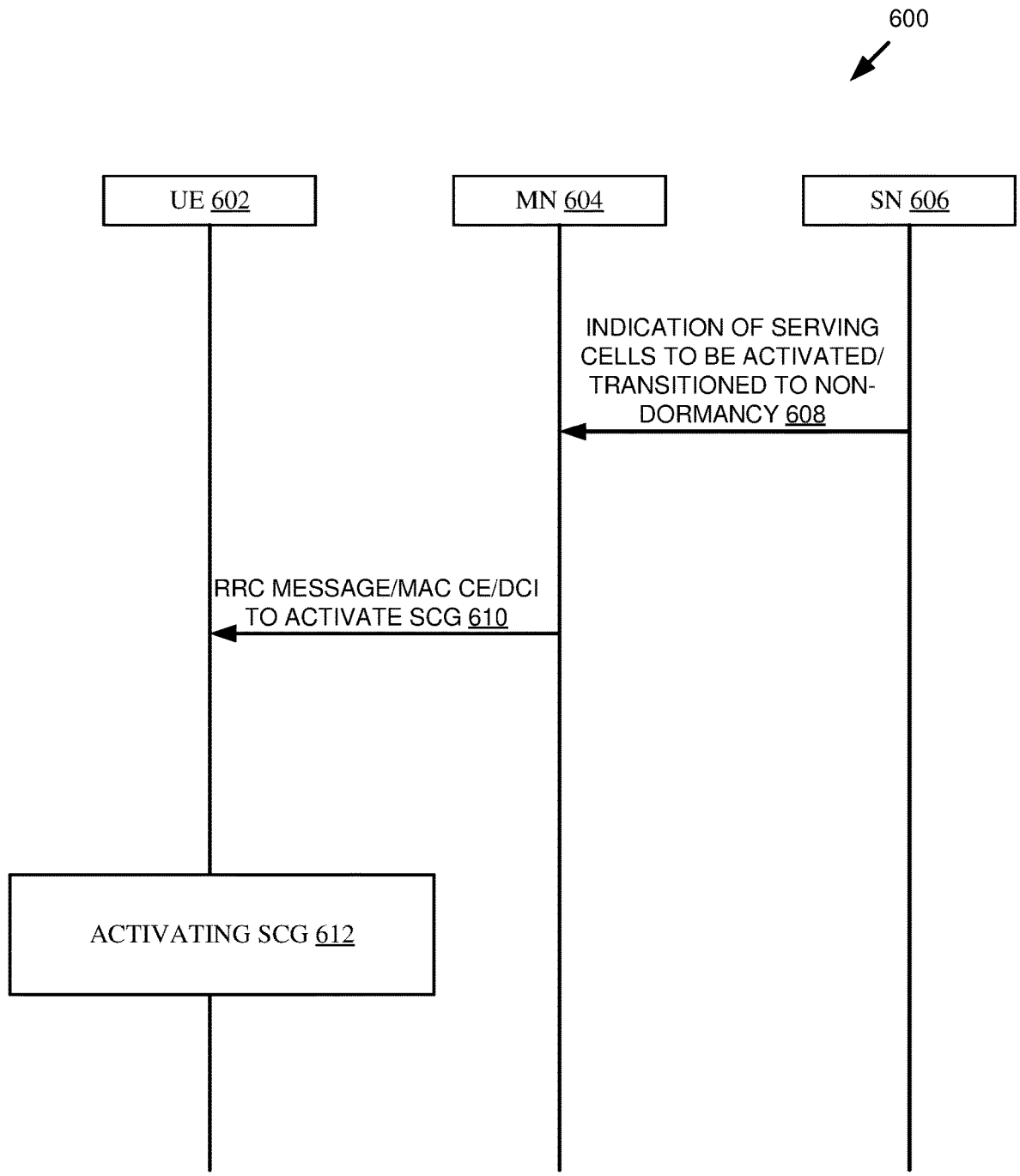
FIG. 6 is an example signaling process for activating an SCG responsive to SN initiation of the SCG activation.

FIG. 6 is an example signaling process 600 for activating an SCG responsive to SN initiation of the SCG activation. The SN 606 may send a message 608 to the MN 604 indicating to the MN the serving cells to be activated/transitioned to non-dormancy. The MN 604 may send an RRC message/MAC CE/DCI message 610 to activate the SCG. The UE 602 can activate the SCG 612.

In some embodiments, the indication to the MN may include information of a serving cell which is to be transited to non-dormancy behavior. In other embodiments, the indication to the MN may include information of serving cell which is to be activated from deactivated state. In other embodiments, the indication to the MN may include an indication that SCG is to be activated from a suspended state.

The SN may indicate the above information to the MN via a RRC message, (e.g., RRCReconfiguration), or an inter-node message IE contained in the message transmitted from SN to MN (e.g., CG-config defined in NR specification).

Upon reception of the indication from SN, the MN may transmit a RRC message (e.g. RRCReconfiguration), a MAC CE, or a DCI to inform the UE to activate SCG (i.e., transition the SCG from suspended state). In the RRC message or MAC CE used to activate SCG, dedicated PRACH resource indicated from SN may be contained. In the RRC message, MAC CE, or the DCI used to activate SCG, the serving cell information to be transited from dormancy behavior, or the serving cell information to be activated may be contained.

The serving cell information may be a bitmap where one bit is used to represent a serving cell, or a list of serving cell index, or a list of serving cell ID. Upon reception of the RRC message, MAC CE, or DCI, the UE may activate SCG serving cell or transition a SCG serving cell from dormancy to non-dormancy.

In the present embodiments, the SN can provide dedicated PRACH resource to the UE along with the SCG activation signaling. SN can also indicate which SCG serving cell is to be activated or transitioned from dormancy behavior. Accordingly, the delay used for SCG activation can be reduced.

Example Embodiment 3

Example Embodiment 3 may generally relate to a MN initiating a SCG activation procedure. In many cases, a MN may initiate SCG activation according to its decision. In the present embodiments, the MN may initiate SCG activation procedure by indicating SN via a message via interface between MN and SN. In some embodiments, the MN may initiate SCG activation by SN modification procedure as defined in 3GPP specification. The SN modification request message may include an indication to request SCG activation.

Figure 7:
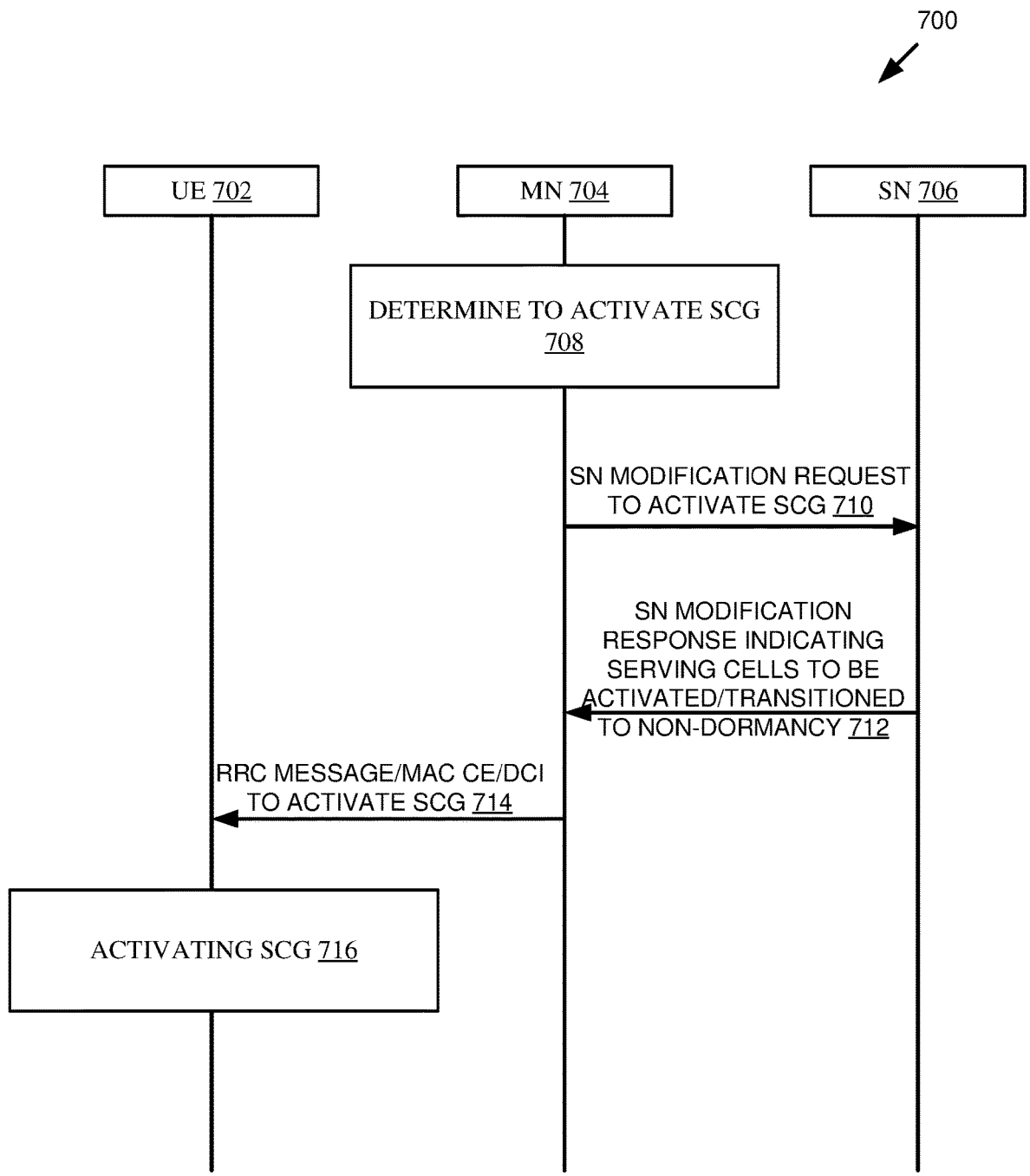
FIG. 7 is an example signaling process for a MN initiating a SCG activation procedure.

FIG. 7 is an example signaling process 700 for a MN initiating a SCG activation procedure. The MN 704 may decide to activate SCG (block 708). The MN 704 may send a SN modification request 710 to the SN 706 indication a request to activate SCG. The SN 706 may send a SN modification response 712 to the MN 704 that includes the serving cells to be activated or transitioned to non-dormancy. The MN 704 may send an RRC message/MAC CE/DCI 714 to the UE 702 to activate the SCG. The UE 702 may activate the SCG 716 responsive to receiving the RRC message/MAC CE/DCI 714.

Upon reception of a SN modification request message, SN may respond with a SN modification response message which may include the dedicated PRACH resource for the UE perform RACH procedure on a SCG serving cell. The dedicated PRACH resource may be contention free RACH resource in a SCG serving cell. This dedicated PRACH resource may be forwarded to UE by MN to speed up synchronization with SN.

The SN modification response message may include information of serving cell which is to be transited to non-dormancy behavior or information of serving cell which is to be activated from deactivated state.

Upon reception of the indication from SN, the MN transmit a RRC message (e.g. RRCReconfiguration), or a MAC CE, or a DCI to inform UE to activate SCG (i.e., transition SCG from a suspended state).

In the RRC message or MAC CE used to activate SCG, dedicated PRACH resource indicated from SN may be contained. In the RRC message, MAC CE, or the DCI used to activate SCG, the serving cell information to be transited from dormancy behavior, or the serving cell information to be activated may be contained.

The serving cell information may be a bitmap which one bit is used to represent a serving cell, or a list of serving cell index, or a list of serving cell ID. Upon reception of the RRC message, MAC CE or DCI, the UE activate SCG serving cell, or transit a SCG serving cell from dormancy to non-dormancy.

At least in one of following case, the MN may want to activate SCG when there is split DRB or SRB to be configured. The MN may want to activate SCG when there is a DRB terminated on SN to be configured. The MN may want to activate SCG when there is data to be transmitted via a DRB that is an MN-terminated SCG bearer, or MN-terminated spit bearer.

Accordingly, there may be a need for the MN initiated SCG activation procedure. The MN can initiate SCG activation by reuse current procedure as much as possible.

Example Embodiment 4

Example Embodiment 4 may generally relate to UE activation of a SCG upon reception of RRC reconfiguration information. Upon reception of a RRC reconfiguration message from BS, if the RRC reconfiguration message contains reconfiguration of SCG, the UE may activate SCG autonomously and apply the reconfiguration.

In some embodiments, if the reconfiguration involves PSCell, the UE applies the reconfiguration and activates PSCell autonomously.

In some embodiments, if the RRC reconfiguration message contains IE reconfigurationWithSync or mobilityControlInfo as defined in 3GPP specification, the UE can apply the reconfiguration and activate at least PSCell.

In some embodiments, if the reconfiguration involves physical layer configuration of a SCG serving cell (e.g., add or modify serving cell or configuration of physical layer of a serving cell), the UE activates at least the PSCell and the involved SCG serving cell.

This may provide an opportunity for the UE to verify whether the new SCG configuration is valid.

Example Embodiment 5

Example Embodiment 5 may generally relate to channel measurement configuration and reporting. The channel measurement can include CSI measurement or CQI measurement. In many cases, the SN may configure channel measurement configuration for the UE and indicate the configuration via a RRC message transmitted via SCG directly to UE or a RRC message encapsulated in another RRC message generated by MN. In either case, the SN and MN may configure a channel measurement configuration for MCG serving and SCG serving cell, respectively. The channel reporting for a SCG serving cell may be reported via SCG serving cells only.

In many cases, when SCG is in a suspended state and channel measurement reporting is to be performed, the channel measurement reporting for serving cell of SCG may be transmitted via MCG.

In the present embodiments, to enable channel measurement reporting via MCG for serving cells of SCG, the SN can indicate to MN a list of channel measurement configuration. A channel measurement configuration may include a serving cell index that can be used to identify a SCG serving cell for which the channel measurement configuration is configured. The channel measurement configuration may include a channel measurement reporting type. The channel measurement reporting type may be periodic on PUCCH, semi-persistent on PUCCH, semi-persistent on PUSCH, aperiodic on PUSCH.

The CSI/CQI measurement configuration may include report quantity information used to indicate the needed measurement quantity for reporting. The channel measurement configuration may include a channel measurement resource information.

In some embodiments, the channel measurement resource information may be a set of channel measurement resource configuration. The channel measurement resource configuration may include a BWP ID which indicates a DL BWP which the channel measurement resource for measurement are located. The channel measurement resource configuration may further include a resource type indication.

In some embodiments, the channel measurement resource information may be a channel measurement resource configuration ID that identifies a channel measurement resource configuration which is configured by the SN to UE beforehand.

The SN may provide MN above information via a RRC message (e.g. RRCReconfiguration), or an inter-node message IE contained in the message transmitted from SN to MN (e.g. CG-config as defined in NR specification).

The MN may configure channel measurement reporting configuration for a SCG serving cell. The channel measurement reporting configuration may include a channel measurement reporting ID. The channel measurement reporting configuration may further include a set of reporting resources configuration.

In some embodiments, the reporting resource configuration may include an MCG serving cell index on which the reporting resource is located, a reporting type information, and PUCCH or PUSCH resource configuration for reporting.

In some embodiments, the reporting resource configuration may include a uplink SPS resource configuration, or a configured grant configuration.

Figure 8:
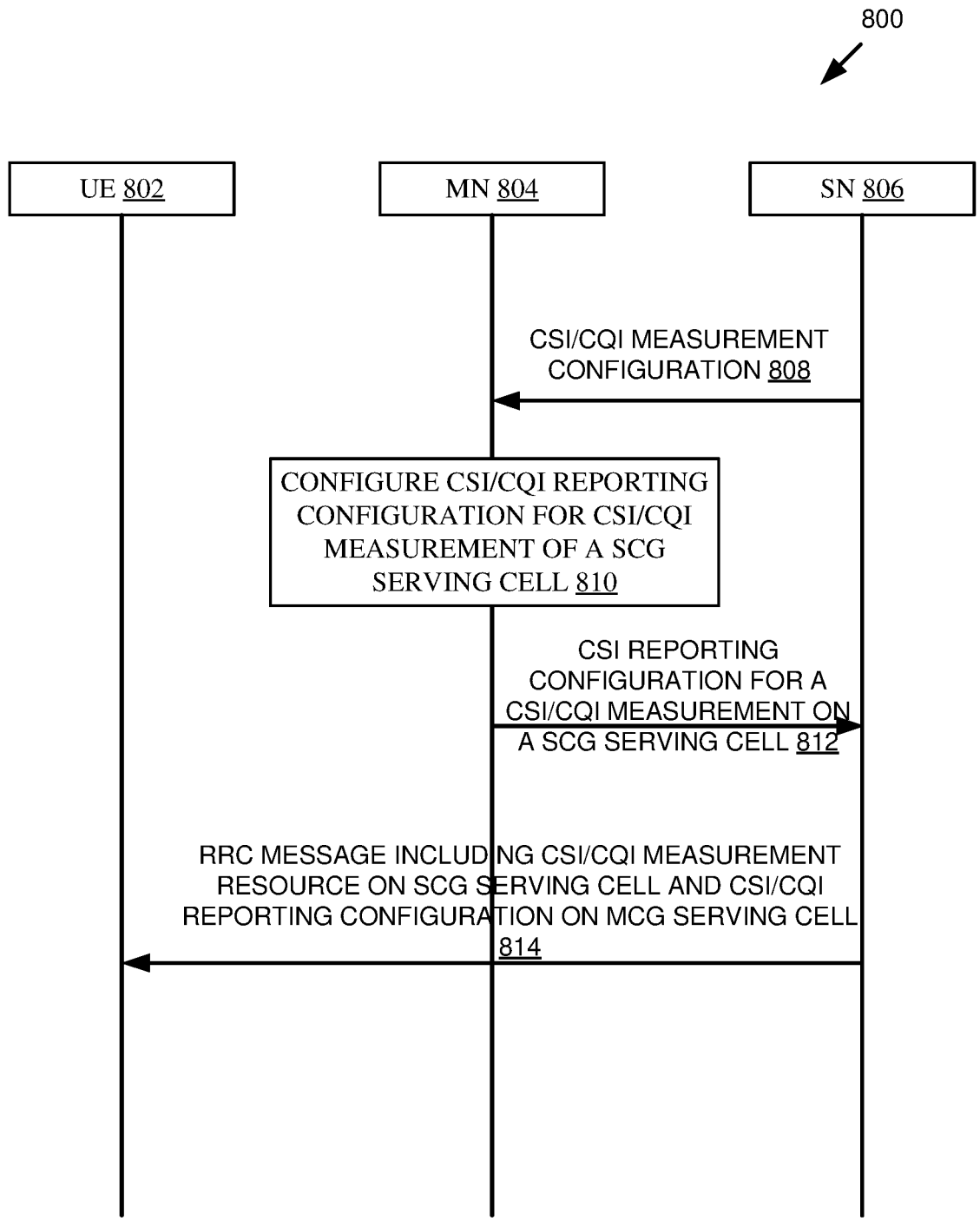
FIG. 8 is an example signaling process for indicating a channel measurement reporting configuration according to a first option.

In a first option, the MN may indicate the channel measurement reporting configuration to the SN. FIG. 8 is an example signaling process 800 for indicating a channel measurement reporting configuration according to a first option. The SN 806 may send a channel measurement configuration 808 to a MN 804. The channel measurement configuration 808 can include a SCG serving cell index, resource configuration, reporting quantity, etc.

The MN 804 can configure channel measurement reporting configuration for channel measurement of a SCG serving cell (block 810). The MN 804 may send a channel measurement reporting configuration for a channel measurement on a SCG serving cell 812 to the SN 806.

The SN 806 can send an RRC message 814 to the UE 802. The RRC message 814 may include channel measurement resources on a SCG serving cell and channel measurement reporting configuration on a MCG serving cell.

The SN may indicate the channel measurement reporting configuration for the SCG serving cell to the UE via a RRC message generated by the SN. The channel measurement reporting configuration may be associated with the channel measurement resource configuration of the SCG serving cell. In the RRC message, the SN may indicate the channel measurement reporting resource is located on a MCG serving cell. In the RRC message, the SN may indicate the channel measurement resource configuration and its associated channel measurement reporting configuration ID which is allocated by the MN for the SCG serving cell.

Figure 9:
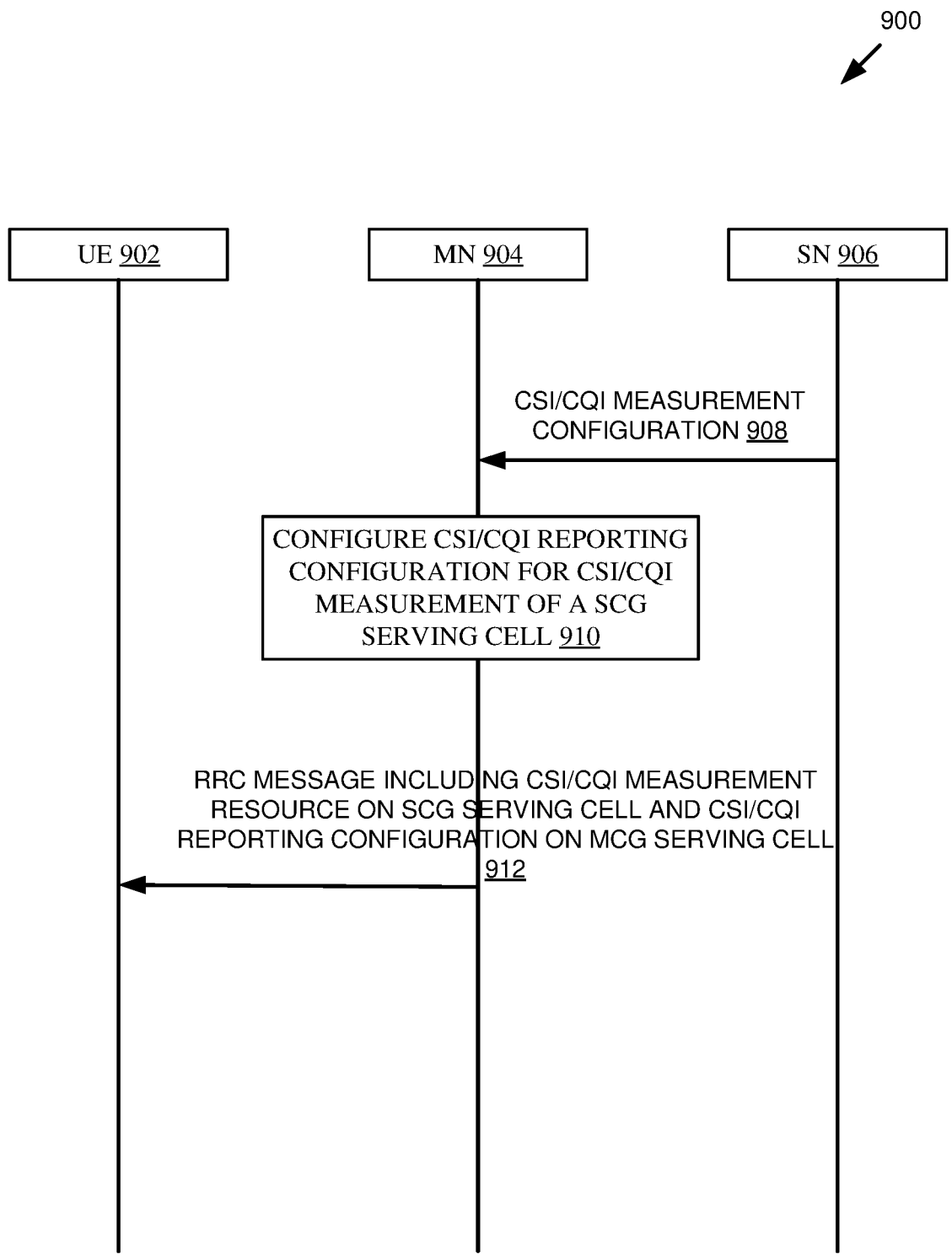
FIG. 9 is an example signaling process for indicating a channel measurement reporting configuration according to a second option.

In a second option, the MN may indicate the channel measurement reporting configuration to the UE directly via a RRC message generated by the MN. FIG. 9 is an example signaling process 900 for indicating a channel measurement reporting configuration according to a second option. The SN 906 may send a channel measurement configuration 908 to a MN 904. The channel measurement configuration 908 can include a SCG serving cell index, resource configuration, reporting quantity, etc.

The MN 904 can configure channel measurement reporting configuration for channel measurement of a SCG serving cell (block 910). The MN 904 can send an RRC message 912 to the UE 902. The RRC message 912 may include channel measurement resources on a SCG serving cell, channel measurement reporting configuration on a MCG serving cell.

The MN may indicate the channel measurement reporting configuration to the UE directly via a RRC message generated by the MN. The channel measurement reporting configuration may be associated with the channel measurement resource configuration of the SCG serving cell. In the RRC message, the MN may indicate the channel measurement reporting configuration is associated with a SCG serving cell. In the RRC message, the MN may indicate the channel measurement reporting configuration and its associated channel measurement resource configuration ID that is allocated by the SN for the SCG serving cell.

In any of the first or second option, the RRC message may be used to suspend SCG.

The UE may apply the channel measurement reporting configuration upon reception of a RRC message including the channel measurement reporting configuration. The application may stop upon reception of a RRC message which release the channel measurement reporting configuration.

The UE may apply the channel measurement reporting configuration upon starting to apply upon reception of a RRC message, a MAC CE or a DCI which indicate the UE to suspend SCG (i.e. upon suspending SCG). The application may stop upon reception of a RRC message, a MAC CE or a DCI that indicates the UE to activate SCG.

The UE may apply the channel measurement reporting configuration upon starting to apply upon autonomous transition SCG to suspended due to a timer expiration.

Reporting channel measurement results for a SCG serving cell via MCG may be performed. In some embodiments, the UE performs channel measurement reporting according to indicated channel measurement reporting configuration. In some embodiments, if the channel measurement reporting configuration includes PUCCH or PUSCH resource, the UE perform channel measurement reporting on PUCCH or PUSCH according to the configuration. In some embodiments, if the channel measurement reporting configuration includes uplink SPS resource or configured grant resource, the UE performs channel measurement reporting using the uplink SPS resource or configured grant resource. In some embodiments, the channel measurement reporting is performed by transmitting a RRC message, or a MAC CE. The RRC message and the MAC CE includes channel measurement reporting for a list of SCG serving cells.

Upon reception of channel measurement reporting for SCG serving cell from UE, the MN may forward the channel measurement reporting to SN via interface between MN and SN. If channel measurement reporting is transmitted via a RRC message from the UE, the MN may forward the RRC message to the SN.

If channel measurement reporting is transmitted via a MAC CE, or on PUCCH, or on PUSCH, from the UE, in some implementation, the MN may forward the reporting content via a control plane message via interface between MN and SN. In some embodiments, the MN forwards the reporting content via a user plane message via interface between MN and SN. A user plane tunnel is allocated for forwarding the reporting contents.

In any of the present embodiments, the forwarded reporting content may include a list of SCG serving cell index and related reporting, or the forwarded reporting content may include a list of reporting which is sorted according to its associated SCG serving cell index, according to its associated channel measurement reporting ID.

Figure 10:
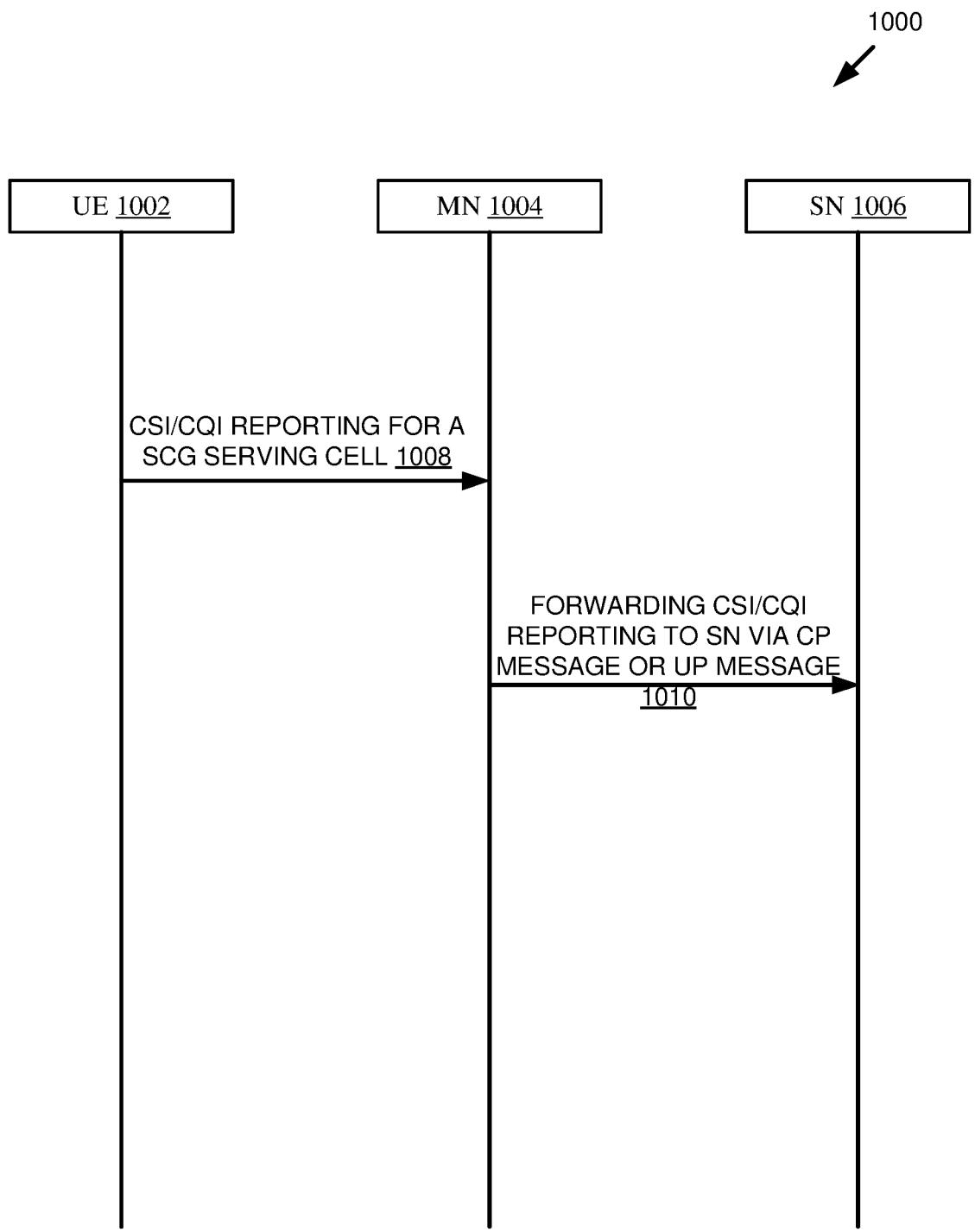
FIG. 10 is an example signaling process for forwarding channel measurement reporting.

FIG. 10 is an example signaling process 1000 for forwarding channel measurement reporting results. The UE 1002 may send a channel measurement reporting message 1008 for a SCG serving cell to a MN 1004. The MN 1004 may forward the channel measurement reporting information 1010 to a SN 1006. The channel measurement reporting information 1010 may include a CP message or a UP message.

In the present embodiment, the MN and SN can cooperate in channel measurement reporting configuration, and channel measurement reporting. Accordingly, the channel measurement reporting for SCG serving cell via MCG may be possible.

Figure 11:
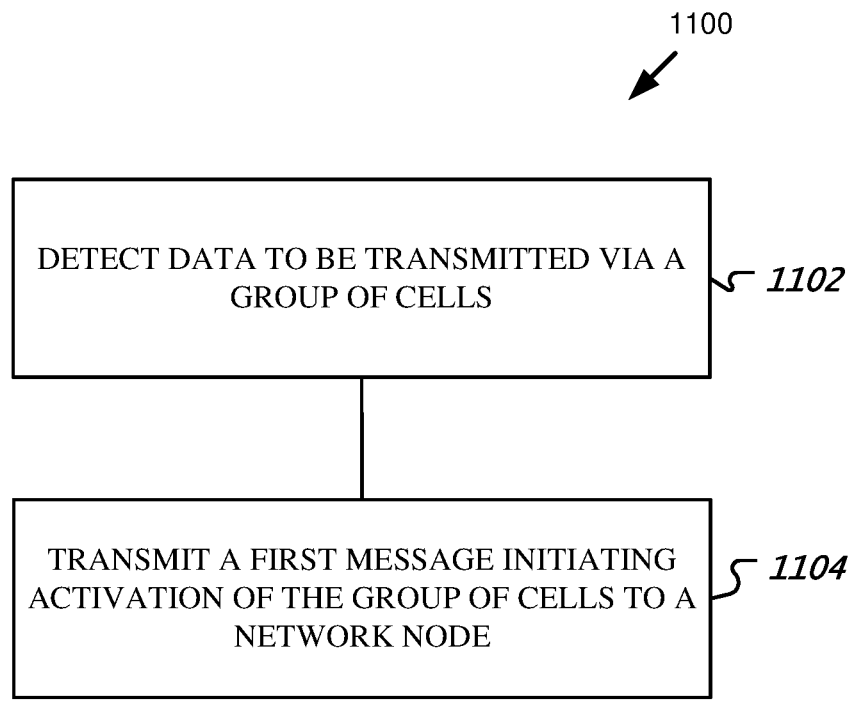
FIG. 11 is an example method for implementing SCG suspension.

FIG. 11 is an example method 1100 for implementing SCG suspension. The method may include detecting, by a terminal, data to be transmitted via a group of cells (block 1102). The group of cells may include an SCG as described herein. The method may also include transmitting, by the terminal, a first message initiating activation of the group of cells to a network node (block 1104). The network node may include any of the MN or SN as described herein.

In some embodiments, the method includes receiving, by the terminal, a second message from the network node including an indication to activate the group of cells and activating, by the terminal, the group of cells as specified in the second message.

In some embodiments, activating the group of cells includes transitioning the serving cell of the group of cells from dormancy behavior to non-dormancy behavior.

In some embodiments, activating the group of cells activates the serving cell of the group of cells from a deactivated state to an activated state.

In some embodiments, the first message includes any of a radio resource control (RRC) message and a medium access control (MAC) control element (CE).

In some embodiments, the network node includes a master node (MN).

In some embodiments, the method includes initiating, by the terminal, a physical random-access channel (PRACH) on a primary secondary cell (PSCell) of the group of cells.

In some embodiments, the method includes receiving, by the terminal, a response message from a secondary node (SN) that indicates a serving cell included in the group of cells to be transited from dormancy behavior to non-dormancy behavior, or activated from deactivated state.

In some embodiments, the first message is indicative of a data buffer size and a logical channel group.

In some embodiments, the method includes mapping, by the terminal, the data to a data radio bearer (DRB).

In some embodiments, the DRB includes a bearer for the group of cells indicating that the DRB is mapped to the group of cells and includes a leg for the group of cells.

In some embodiments, the DRB includes a split bearer indicating that the DRB includes a master cell group (MCG) leg and a leg for the group of cells.

In another embodiment, a method for wireless communication includes receiving, by a terminal, a first message providing an indication to activate a serving cell included in a group of cells from a network node. The method may also include activating, by the terminal, the serving cell of the group of cells based on the first message.

In some embodiments, activating the group of cells includes transitioning the serving cell of the group of cells from dormancy behavior to non-dormancy behavior.

In some embodiments, activating the group of cells includes activating the serving cell of the group of cells from a deactivated state to an activated state.

In some embodiments, the network node includes a master node (MN).

In some embodiments, the MN is configured to receive a second message including the serving cell to be activated from dormancy behavior to non-dormancy behavior and includes dedicated physical random-access channel (PRACH) resources from a secondary node (SN), the first message including information included in the second message.

In some embodiments, the method includes transitioning, by the terminal, the serving cell from dormancy behavior to non-dormancy behavior according to the information included in the second message.

In some embodiments, the first message includes any of a radio resource control (RRC) message, a medium access control (MAC) control element (CE), and downlink control information (DCI).

In some embodiments, the MN is configured to determine whether to activate the group of cells.

In some embodiments, the method includes receiving, by the terminal, an RRC reconfiguration message from the network node; and responsive to determining that the RRC reconfiguration message includes a configuration for the group of cells, activating the group of cells according to the configuration for the group of cells.

In another embodiment, a method for wireless communication comprises receiving, by a primary network node, a channel measurement configuration from a secondary network node. The method may also include configuring, by the primary network node, a reporting configuration relating to channel measurements for a serving cell included in a group of cells based on the channel measurement configuration.

In some embodiments, the channel measurement includes any of a channel state information (CSI) measurement and a channel quality indicator (CQI) measurement.

In some embodiments, the method includes sending, by the primary network node, the configured reporting configuration to the secondary network node, the secondary network node configured to send a radio resource control (RRC) message to a terminal that includes channel measurement resources on the serving cell of the group of cells and the channel reporting configuration on a serving cell of a master group of cells.

In some embodiments, the method includes receiving, by the primary network node, a report that includes the channel measurements for the serving cell of the group of cells.

In some embodiments, the method includes forwarding, by the primary network node, the received report that includes the channel measurements for the serving cell of the group of cells to the secondary network node.

In some embodiments, the received report that includes the channel measurements for the serving cell of the group of cells is forwarded by the primary network node to the secondary network node via a control plane (CP) message.

In some embodiments, the received report that includes the channel measurements for the serving cell of the group of cells is forwarded by the primary network node to the secondary network node via a user plane (UP) message.

In some embodiments, the reporting configuration configured by the primary network node is valid when the group of cells is suspended.

In some embodiments, the received report including the channel measurements for the serving cell of the group of cells forwarded to the secondary network node includes CSI reporting information that includes a cell identifier and reporting content.

Wireless Communication System

Figure 12:
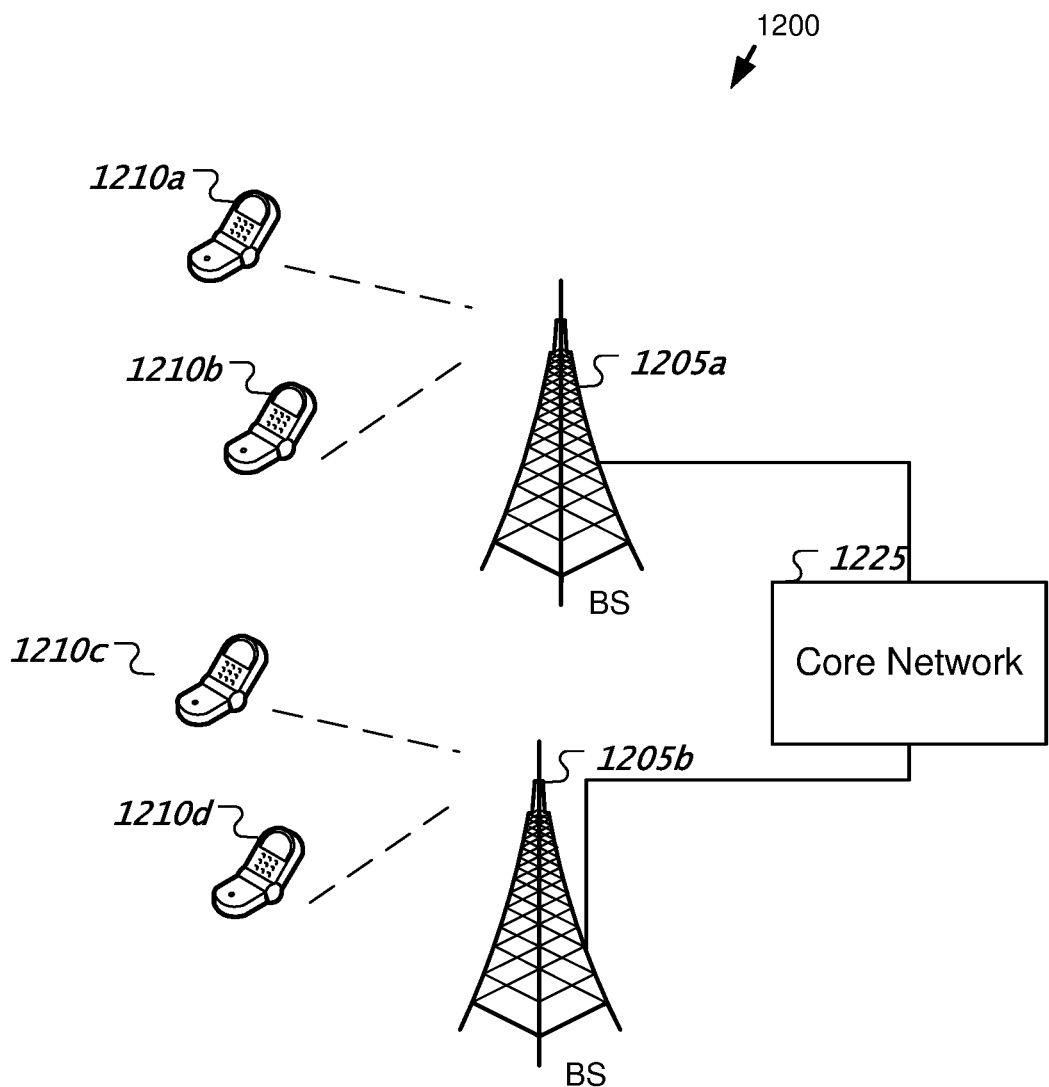
FIG. 12 shows an example of a wireless communication system where techniques in accordance with one or more embodiments of the present technology can be applied.

FIG. 12 shows an example of a wireless communication system where techniques in accordance with one or more embodiments of the present technology can be applied. A wireless communication system 1200 can include one or more base stations (BSs) 1205*a*, 1205*b*, one or more wireless devices 1210*a*, 1210*b*, 1210*c*, 1210*d*, and a core network 1225. A base station 1205*a*, 1205*b* can provide wireless service to wireless devices 1210*a*, 1210*b*, 1210*c* and 1210*d* in one or more wireless sectors. In some implementations, a base station 1205*a*, 1205*b* includes directional antennas to produce two or more directional beams to provide wireless coverage in different sectors.

The core network 1225 can communicate with one or more base stations 1205*a*, 1205*b*. The core network 1225 provides connectivity with other wireless communication systems and wired communication systems. The core network may include one or more service subscription databases to store information related to the subscribed wireless devices 1210*a*, 1210*b*, 1210*c*, and 1210*d*. A first base station 1205*a* can provide wireless service based on a first radio access technology, whereas a second base station 1205*b* can provide wireless service based on a second radio access technology. The base stations 1205*a* and 1205*b* may be co-located or may be separately installed in the domain according to the deployment scenario. The wireless devices 1210*a*, 1210*b*, 1210*c*, and 1210*d* can support multiple different radio access technologies. In some embodiments, the base stations 1205*a*, 1205*b* may be configured to implement some techniques described in the present document. The wireless devices 1210*a* to 1210*d* may be configured to implement some techniques described in the present document.

In some implementations, a wireless communication system can include multiple networks using different wireless technologies. A dual-mode or multi-mode wireless device includes two or more wireless technologies that could be used to connect to different wireless networks.

Figure 13:
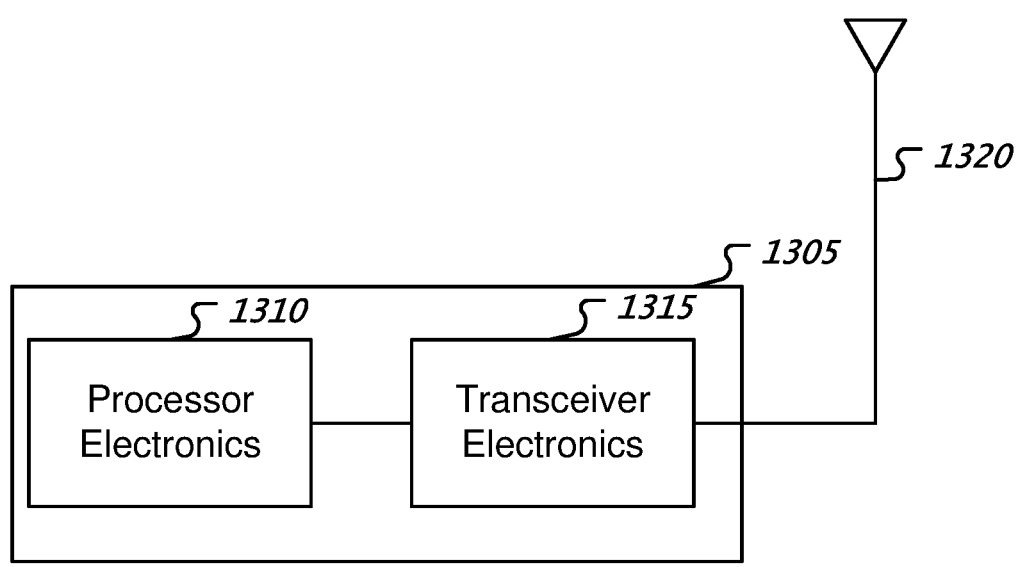
FIG. 13 is a block diagram representation of a portion of a hardware platform.

FIG. 13 is a block diagram representation of a portion of a hardware platform. The communication node as described in the present application may include the hardware platform as described with respect to FIG. 13. A hardware platform 1305 such as a network device or a base station or a wireless device (or UE) can include processor electronics 1310 such as a microprocessor that implements one or more of the techniques presented in this document. The hardware platform 1305 can include transceiver electronics 1315 to send and/or receive wired or wireless signals over one or more communication interfaces such as antenna 1320 or a wireline interface. The hardware platform 1305 can implement other communication interfaces with defined protocols for transmitting and receiving data. The hardware platform 1305 can include one or more memories (not explicitly shown) configured to store information such as data and/or instructions. In some implementations, the processor electronics 1310 can include at least a portion of the transceiver electronics 1315. In some embodiments, at least some of the disclosed techniques, modules or functions and network nodes are implemented using the hardware platform 1305.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for enforcement by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an enforcement environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (domain programmable gate array) or an ASIC (application specific integrated circuit).

Processors suitable for the enforcement of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   detecting, by a terminal, data to be transmitted via a group of cells;
   transmitting, by the terminal, a first message initiating activation of the group of cells to a network node; and
   mapping, by the terminal, the data to a data radio bearer (DRB),
      wherein the DRB includes a bearer for the group of cells indicating that the DRB is mapped to the group of cells and includes a leg for the group of cells,
      wherein the DRB includes a split bearer indicating that the DRB includes a master cell group (MCG) leg and a leg for the group of cells.

2. The method of claim 1, further comprising:
   receiving, by the terminal, a second message from the network node including an indication to activate the group of cells; and
   activating, by the terminal, the group of cells as specified in the second message,
      wherein activating the group of cells includes transitioning a serving cell of the group of cells from dormancy behavior to non-dormancy behavior, or
      wherein activating the group of cells activates a serving cell of the group of cells from a deactivated state to an activated state.

3. The method of claim 1, wherein the first message includes any of a radio resource control (RRC) message and a medium access control (MAC) control element (CE).

4. The method of claim 1, wherein the network node includes a master node (MN).

5. The method of claim 1, further comprising:
   initiating, by the terminal, a physical random-access channel (PRACH) on a primary secondary cell (PSCell) of the group of cells; and
   receiving, by the terminal, a response message from a secondary node (SN) that indicates a serving cell included in the group of cells to be transited from dormancy behavior to non-dormancy behavior, or activated from deactivated state.

6. The method of claim 1, wherein the first message is indicative of a data buffer size and a logical channel group.

7. The method of claim 5, wherein the initiating the PRACH on the PSCell of the group of cells is performed by sending a message directly to a secondary node (SN) and not via a master node (MN), wherein the message includes an identifier of the terminal, a data radio bearer identifier (DRB ID), and a data buffer size that indicates a total data volume available for transmission for a DRB indicated by the DRB ID.

8. A wireless communication apparatus, comprising:
   a processor that is configured to perform a method, which causes the wireless communication apparatus to:
   detect, by a terminal, data to be transmitted via a group of cells;
   transmit, by the terminal, a first message initiating activation of the group of cells to a network node; and
   map, by the terminal, the data to a data radio bearer (DRB),
      wherein the DRB includes a bearer for the group of cells indicating that the DRB is mapped to the group of cells and includes a leg for the group of cells,
      wherein the DRB includes a split bearer indicating that the DRB includes a master cell group (MCG) leg and a leg for the group of cells.

9. The wireless communication apparatus of claim 8, wherein the processor is further configured to cause the wireless communication apparatus to:
   receive, by the terminal, a second message from the network node including an indication to activate the group of cells; and
   activate, by the terminal, the group of cells as specified in the second message,
      wherein activating the group of cells includes transitioning a serving cell of the group of cells from dormancy behavior to non-dormancy behavior, or
      wherein activating the group of cells activates a serving cell of the group of cells from a deactivated state to an activated state.

10. The wireless communication apparatus of claim 8, wherein the first message includes any of a radio resource control (RRC) message and a medium access control (MAC) control element (CE).

11. The wireless communication apparatus of claim 8, wherein the network node includes a master node (MN).

12. The wireless communication apparatus of claim 8, wherein the processor is further configured to cause the wireless communication apparatus to:
   initiate, by the terminal, a physical random-access channel (PRACH) on a primary secondary cell (PSCell) of the group of cells; and
   receive, by the terminal, a response message from a secondary node (SN) that indicates a serving cell included in the group of cells to be transited from dormancy behavior to non-dormancy behavior, or activated from deactivated state.

13. The wireless communication apparatus of claim 12, wherein the PRACH is initiated on the PSCell of the group of cells by the wireless communication apparatus that is configured by the processor to send a message directly to a secondary node (SN) and not via a master node (MN), wherein the message includes an identifier of the terminal, a data radio bearer identifier (DRB ID), and a data buffer size that indicates a total data volume available for transmission for a DRB indicated by the DRB ID.

14. The wireless communication apparatus of claim 8, wherein the first message is indicative of a data buffer size and a logical channel group.

15. A non-transitory computer readable medium having code stored thereon, the code when executed by a processor, causing the processor to perform a method, comprising:
   detecting, by a terminal, data to be transmitted via a group of cells;
   transmitting, by the terminal, a first message initiating activation of the group of cells to a network node; and
   mapping, by the terminal, the data to a data radio bearer (DRB),
      wherein the DRB includes a bearer for the group of cells indicating that the DRB is mapped to the group of cells and includes a leg for the group of cells,
      wherein the DRB includes a split bearer indicating that the DRB includes a master cell group (MCG) leg and a leg for the group of cells.

16. The non-transitory computer readable medium of claim 15, wherein the method further comprises:
   receiving, by the terminal, a second message from the network node including an indication to activate the group of cells; and
   activating, by the terminal, the group of cells as specified in the second message,
      wherein activating the group of cells includes transitioning a serving cell of the group of cells from dormancy behavior to non-dormancy behavior, or
      wherein activating the group of cells activates a serving cell of the group of cells from a deactivated state to an activated state.

17. The non-transitory computer readable medium of claim 15, wherein the first message includes any of a radio resource control (RRC) message and a medium access control (MAC) control element (CE).

18. The non-transitory computer readable medium of claim 15, wherein the network node includes a master node (MN).

19. The non-transitory computer readable medium of claim 15, wherein the method further comprises:
   initiating, by the terminal, a physical random-access channel (PRACH) on a primary secondary cell (PSCell) of the group of cells; and
   receiving, by the terminal, a response message from a secondary node (SN) that indicates a serving cell included in the group of cells to be transited from dormancy behavior to non-dormancy behavior, or activated from deactivated state.

20. The non-transitory computer readable medium of claim 19, wherein the initiating the PRACH on the PSCell of the group of cells is performed by sending a message directly to a secondary node (SN) and not via a master node (MN), wherein the message includes an identifier of the terminal, a data radio bearer identifier (DRB ID), and a data buffer size that indicates a total data volume available for transmission for a DRB indicated by the DRB ID.

* * * * *